United States Patent
Simonpietri et al.

(10) Patent No.: US 10,041,816 B2
(45) Date of Patent: Aug. 7, 2018

(54) SAGNAC-RING FIBER-OPTIC INTERFEROMETRIC SYSTEM WITH RAYLEIGH LENGTH SPACED POLARIZER

(71) Applicant: IXBLUE, Saint-Germain-en-Laye (FR)

(72) Inventors: Pascal Simonpietri, Cormeilles en Parisis (FR); Stephane Chouvin, Bagneux (FR); Cedric Molucon, Saint-Germain-en-Laye (FR)

(73) Assignee: IXBLUE, Saint-Germain-en-Laye (FR)

( * ) Notice: Subject to any disclaimer, the term of this patent is extended or adjusted under 35 U.S.C. 154(b) by 0 days.

(21) Appl. No.: 15/324,967

(22) PCT Filed: Jul. 6, 2015

(86) PCT No.: PCT/FR2015/051865
§ 371 (c)(1),
(2) Date: Jan. 9, 2017

(87) PCT Pub. No.: WO2016/005691
PCT Pub. Date: Jan. 14, 2016

(65) Prior Publication Data
US 2017/0211952 A1  Jul. 27, 2017

(30) Foreign Application Priority Data
Jul. 8, 2014 (FR) ..................... 14 56551

(51) Int. Cl.
*G01D 5/353* (2006.01)
*G01D 5/34* (2006.01)
(Continued)

(52) U.S. Cl.
CPC ....... *G01D 5/35322* (2013.01); *G01C 19/722* (2013.01); *G01D 5/344* (2013.01);
(Continued)

(58) Field of Classification Search
CPC .... G01C 19/72; G01C 19/721; G01C 19/722; G01C 19/726; G01D 5/35322; G02F 2001/211; G02B 6/126; G02B 6/2726
See application file for complete search history.

(56) References Cited

U.S. PATENT DOCUMENTS

| 4,639,138 A * | 1/1987 | Martin ................... G01C 19/72 356/460 |
| 5,131,749 A | 7/1992 | Varnham |

(Continued)

FOREIGN PATENT DOCUMENTS

EP  1 469 283 A2  10/2004

OTHER PUBLICATIONS

Eric C. Kintner: "Polarization control in optical-fiber gyroscopes", Optics Letters, vol. 6, No. 3, Mar. 1, 1981 (Mar. 1, 1981), pp. 154, XP055194583, ISSN: 0146-9592, DOI: 10.1364/OL.6.000154.

(Continued)

*Primary Examiner* — Michael P LaPage
(74) *Attorney, Agent, or Firm* — Young & Thompson

(57) ABSTRACT

Disclosed is an optical fiber interferometric system including a light source (1), a fiber optic coil (8), a coil splitter (3), a photodetector (2), and a polarization filtering unit. According to an embodiment, the polarization filtering unit includes a first waveguide polarizer (51), at least one second thin-plate polarizer (52) and an optical waveguide section (12), the at least one second polarizer (52) being disposed in the Rayleigh zone between a first waveguide end (21) of the first polarizer (51) and a second waveguide end (22) of the optical waveguide section (12).

20 Claims, 3 Drawing Sheets

(51) Int. Cl.
*G01C 19/72* (2006.01)
*G02B 6/126* (2006.01)
*G02F 1/21* (2006.01)
*G02B 5/126* (2006.01)

(52) U.S. Cl.
CPC ............ *G01C 19/721* (2013.01); *G02B 5/126* (2013.01); *G02B 6/126* (2013.01); *G02F 2001/211* (2013.01)

(56) References Cited

U.S. PATENT DOCUMENTS

| | | | |
|---|---|---|---|
| 5,475,772 A | 12/1995 | Hung et al. | |
| 6,545,261 B1 * | 4/2003 | Blake .................. | G01B 11/272 250/227.27 |
| 2016/0363446 A1 * | 12/2016 | Lefevre ................ | G01C 19/727 |

OTHER PUBLICATIONS

International Search Report, dated Oct. 6, 2015, from corresponding PCT application.

* cited by examiner

SAGNAC-RING FIBER-OPTIC INTERFEROMETRIC SYSTEM WITH RAYLEIGH LENGTH SPACED POLARIZER

The present invention relates to a Sagnac-ring fiber-optic interferometric system. Such an interferometric system finds applications in particular in the fiber-optic gyroscopes (or FOG).

The fiber-optic gyroscopes are more and more used for rotation measurement in inertial navigation or guiding systems due to their performances in sensitivity, linearity, stability and to the advantage of compactness due to the use of optical fibers.

Figure 1:
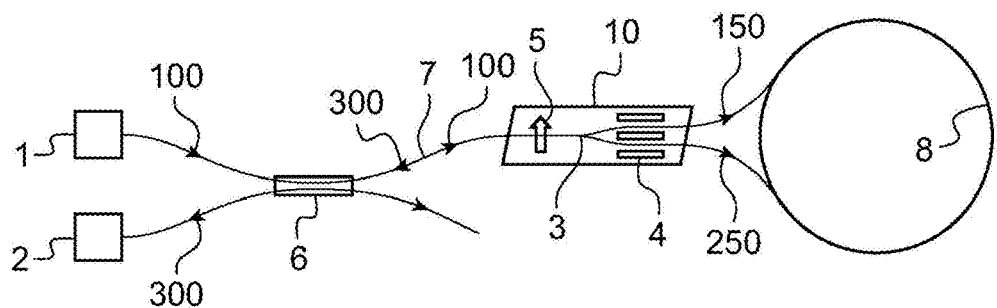

FIG. 1 schematically shows a Sagnac-ring fiber-optic interferometric system of the prior art. This interferometric system includes a light source 1, a fiber optic coil 8, a photosensor 2, and two optical beam splitters: a coil splitter 3 and a source-receiver splitter 6, called receiver splitter. The coil splitter 3 spatially separates the source beam 100 into a first split beam 150 and a second split beam 250 that propagate in opposite directions in the fiber optic coil 8. At the output of the coil, the coil splitter 3 recombines these two beams to form an interferometric beam 300. The source-receiver splitter 6 guides the interferometric beam 300 towards the photodetector 2.

When the interferometric system is at rest, the two split beams exit from the fiber optic coil in phase which each other, due to the reciprocity of the optical paths in the fiber optic coil.

However, in the presence of physical phenomena liable to produce non-reciprocal effects in the optical path of the two counter-propagating beams in the fiber optic coil, a phase shift appears in the detected interferometric beam.

Among the main physical phenomena inducing non-reciprocal effects, the rotation of the interferometric system about the axis of the fiber optic coil induces a phase shift proportional to the rotation rate $\Omega$. From this property, called Sagnac effect, ensues the main application of a Sagnac-ring interferometer to a gyroscope to measure a rotation rate. Other physical phenomena, such as the Faraday magneto-optic effect, are also liable to induce non-reciprocal phase shifts, and may hence be measured by means of a Sagnac-ring interferometer and are used for example in current sensors.

However, certain spurious phenomena produce non-reciprocal effects liable to disturb the accuracy, the sensitivity and the time stability of a fiber-optic interferometer.

Hence, coupling effects between different spatial modes are liable to occur in a multi-mode optical fiber. The use of a of single-mode optical fiber coil or a section of single-mode optical fiber before the coil splitter allows filtering the propagation of a spatial single-mode beam.

Due to a birefringence, even very low, in the coil of fiber, coupling effects between polarizations may occur in the fiber optic coil. These polarization coupling phenomena may induce spurious phase shifts at the origin of bias errors.

The use of a polarizer 5 at the common input-output of the fiber optic coil allows performing a polarization filtering. A polarizer 5 with a high polarization rejection ratio allows reducing significantly the bias errors of a Sagnac-ring fiber-optic interferometer (R. Ulrich, "Polarization and Depolarization in the Fiber-Optic Gyroscope", Fiber-Optic Rotation Sensors and Related Technologies, 52-77, 1982, Springer-Verlag).

In a particularly advantageous configuration, illustrated in FIG. 1, the fiber-optic interferometer includes a multifunction integrated optical circuit (IOC). The IOC 10 comprises optical waveguides preferably formed by proton exchange on a lithium niobate substrate. The input waveguide forms a waveguide polarizer 5 that guides only one polarization. The IOC 10 also comprises a Y-junction coil splitter 3 formed by division of the waveguide 5 into two branches. Advantageously, the IOC 10 also comprises an optical modulator 4 adapted to modulate the phase shift between the two counter-propagating beams. Such a multifunction IOC 10 may easily be connected by sections of optical fiber, on the one hand, to the source-receiver splitter 6 and, on the other hand, to the ends of the fiber optic coil 8.

Figure 2:
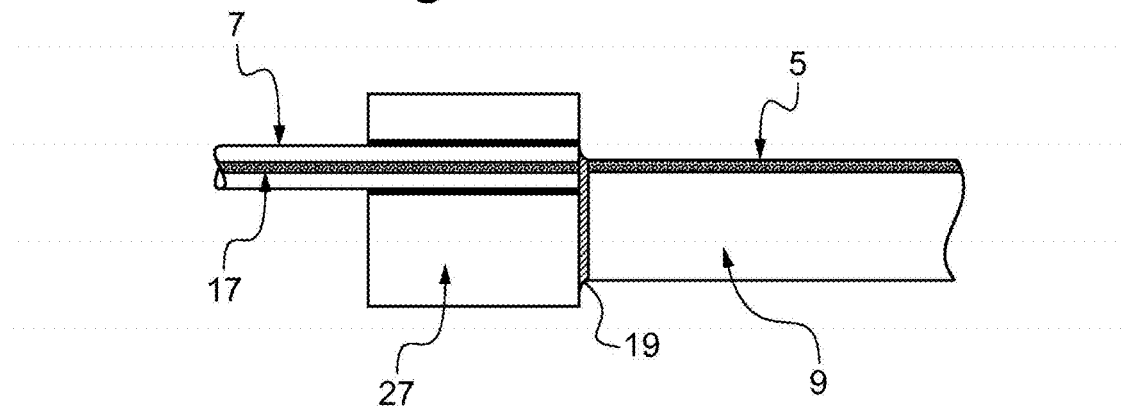

Therefore, FIG. 2 schematically shows a sectional view of a detail of the end of an optical fiber 20 connected to a waveguide polarizer 5 formed on an integrated optical circuit substrate 9 as used in an interferometric device of the prior art, illustrated for example in FIG. 1. In this example, the source-receiver splitter 6 is connected to the integrated optical circuit 10 by an optical fiber 7. The optical fiber 7 has a core 17, that is preferably single-mode. The end of the optical fiber 7 is generally bonded to a ferrule 27, which allows connecting and aligning the end of the optical fiber to the waveguide 5. The core 17 of the optical fiber is aligned and centred with respect to the waveguide 5 formed for example by proton exchange on a lithium niobate substrate 9. The optical fiber 17, via the ferrule, is made integral with the integrated optical circuit by means of a glue 19 that is transparent at the wavelength used.

The mounting of FIG. 2 advantageously allows making a spatial single-mode filter by means of the fiber 7 and a polarization filter by means of the waveguide polarizer 5.

A waveguide polarizer 5 formed by proton exchange allows separating, on the one hand, a polarization state, for example TE, guided in the waveguide 8 and, on the other hand, a polarization state, for example TM, non-guided, that propagates in the substrate. The waveguide polarizers integrated on a lithium niobate substrate have a very high polarization rejection ratio for the non-guided polarization and a very limited insertion loss for the guided polarization.

However, a waveguide polarizer operates by a polarization-selective waveguide effect and not by absorption. That way, a part of the non-guided beam that propagates in the substrate may be recoupled in the optical fiber at the output of the IOC, after one or several internal reflections in the substrate.

In practice, in a proton-exchange polarizer 5 as illustrated in FIG. 2, the internal reflections of non-guided light in the substrate limit the polarization rejection ratio to a power of about −45 dB. Integrated circuits including a groove in the rear face of the substrate allow attenuating the spurious internal reflections and obtaining a polarization rejection ratio of at best −65 dB.

It results therefrom that a residual component of TM polarization that propagates via the substrate of a proton-exchange polarizer 8 may be transmitted to the fiber optic coil. Now, a so-called single-mode fiber supports in reality two polarization modes. The couplings between polarization modes are the cause of bias instability. It has been shown that the optical phase-shift error of a fiber-optic interferometer is limited by the amplitude rejection ratio $\epsilon$ of the polarizer located at the input/output of the ring interferometer and not by the intensity rejection ratio $\epsilon^2$ of the polarizer (Kintner, E. C., "Polarization Control in Optical-Fiber Gyroscopes", Optics Letters, Vol. 6, 1981, pp. 154-156 (SPIE MS 8, pp. 236-238)). Obtaining a maximum phase-measurement error of $10^{-7}$ rad requires a polarization rejection ratio of −140 dB and not of −70 dB.

The quality of the polarizer hence influences the performances of certain applications, in particular in a fiber-optic gyroscope. To improve the performances in bias error of a fiber-optic interferometer, it is hence desirable to improve the polarization rejection ratio in the fiber-optic interferometer. It is estimated that a polarization rejection ratio of −80 dB to −110 dB is required to significantly reduce the bias errors in a ring fiber-optic interferometer, i.e. a polarization rejection ratio $\epsilon$ of $10^{-4}$ to $10^{-5.5}$ in amplitude. However, there exists no polarizer having an extinction ratio of −100 dB.

Searching to avoid the propagation of the beam of TM polarization in the substrate of a waveguide polarizer, it has been proposed to place another polarizer (such as, for example, a polarization splitter cube, a crystal plate) on the common input-output fiber 7, and to connect this other polarizer to the integrated optical circuit 10 via a polarization-maintaining fiber. However, the alignment defect, on the one hand, between the polarization-maintaining fiber and the additional polarizer and, on the other hand, between the polarization-maintaining fiber and the integrated optical circuit, creates a channeled spectrum formed by spurious interferences on the detected signal. This channeled spectrum induces a defect of mean wavelength and is harmful in particular for the scale factor of a fiber-optic gyroscope.

Another solution consists in using a polarizing fiber on the common input-output path 7. However, a polarizing fiber has the drawback to be very sensitive to curvatures: the losses and the polarization extinction ratio (PER) are modified as a function of the radius of curvature and of the axis of such a curvature. Generally, a polarizing fiber of limited length is rather used on the input path. However, a polarizing fiber may also be used for the coil. Nevertheless, the length of the polarizing optical fiber usable in a coil is in practice limited by the attenuation per unit length and by the cost associated to the polarizing fibers.

Now, the sensitivity of a Sagnac-ring fiber-optic interferometer is proportional to the length of the optical fiber. The non-polarizing optical fibers hence represent the preferred choice for optical fiber coils of great length (several hundreds of meters to several tens of kilometers) for a low cost.

In practice, the polarization rejection ratio of a polarizer being limited, a compromise must generally be found between polarization filtering, polarization conservation in the fiber optic coil and statistic depolarization.

One of the objects of the invention is to propose a Sagnac-ring fiber-optic interferometric system that is not very sensitive to the non-reciprocal spurious polarization effects.

One of the objects of the invention is to propose a Sagnac-ring fiber-optic interferometric system having high performances in bias error and stability.

The present invention has for object to remedy the drawbacks of the prior-art devices and more particularly relates to a fiber-optic interferometric system comprising a light source adapted to emit a source beam at a wavelength $\lambda_0$ in vacuum, a fiber optic coil forming a ring optical path, a coil splitter adapted to spatially separate the source beam into a first split beam and a second split beam, so that the first split beam and the second split beam travel through the fiber optic coil in opposite directions, the coil splitter being adapted to recombine said first split beam and second split beam after propagation in opposite directions in the fiber optic coil, so as to form an interferometric beam, a receiver splitter adapted to guide the interferometric beam towards a photodetector, optical guiding means adapted to direct the source beam towards the first optical separation means and polarization filtering means.

According to the invention, the polarization filtering means comprise a first waveguide polarizer, at least one other thin-plate polarizer having a physical thickness e and a refractive index n and at least one optical waveguide section, the first polarizer and the at least one other polarizer being juxtaposed in series in the optical path between the receiver splitter and the fiber optic coil, the at least one other thin-plate polarizer being interposed between, on the one hand, a first waveguide end of the first polarizer and, on the other hand, a second waveguide end of said optical waveguide section, the physical distance d between the first waveguide end of the first polarizer and the second waveguide end of said optical waveguide section being lower than or equal to twice the Rayleigh length, i.e.:

$$d \leq 2 \times \frac{\pi w_0^2}{\lambda_m}$$

where $$\lambda_m = \frac{\lambda_0}{n}$$

is the wavelength of the beam in a medium of index n and $w_0$ represents the radius of a single-mode beam at 1/e in amplitude in said waveguides of said optical waveguide section and of the first waveguide polarizer and the physical thickness e of the at least one other polarizer being lower than or equal to the physical distance d.

This combination of two particular polarizers in series allows increasing the polarization rejection ratio by comparison with a prior-art device including only one polarizer, without generating spurious interference effects. Moreover, this combination induces extremely limited insertion losses and does not modify the bulkiness of the interferometric system.

The interferometric system of the invention has a very low bias error induced by polarization.

Advantageously, the at least one other thin-plate polarizer has a physical thickness e lower than or equal to $$\frac{\pi w_0^2}{\lambda_m}$$

and the physical distance d is lower than or equal to $$\frac{\pi w_0^2}{\lambda_m}.$$

Particularly advantageously, the at least one other thin-plate polarizer has a physical thickness e lower than or equal to $$\frac{\pi w_0^2}{2 \times \lambda_m}$$

and the physical distance d is lower than or equal to $$\frac{\pi w_0^2}{2 \times \lambda_m}.$$

According to particular and advantageous aspects of embodiments of the invention:
- the at least one other thin-plate polarizer has a physical thickness e lower than or equal to 50 microns and preferably lower than or equal to 30 microns;
- the at least one other polarizer is formed of a thin plate of polarizing glass;
- the first waveguide polarizer is a fiber-optic polarizer;
- the first waveguide polarizer is a waveguide polarizer integrated on an integrated optical circuit;
- the first waveguide polarizer is formed by proton exchange on a lithium niobate substrate.

In a particular and advantageous embodiment, the interferometric system comprises an integrated optical circuit on a lithium niobate substrate, the integrated optical circuit comprising the first waveguide polarizer, the coil splitter and an optical phase modulator.

Advantageously, the polarization rejection ratio of the at least one thin-plate polarizer is higher than or equal to −20 dB and the polarization rejection ratio of the waveguide polarizer is higher than or equal to −40 dB.

In a first embodiment, said at least one optical waveguide section, said at least one other polarizer and the first waveguide end of the first polarizer are arranged on the optical path of the source beam between the coil splitter and the receiver splitter.

Advantageously, in this embodiment, said at least one optical waveguide section comprises a section of single-mode optical fiber connected to the receiver splitter.

In another embodiment, alternative or complementary to the first embodiment, said at least one optical waveguide section, said at least one other polarizer and the first waveguide end of the first polarizer are arranged on the optical path of the first split beam and/or the second split beam, between the coil splitter and the fiber optic coil.

Advantageously, in this embodiment, said at least one optical waveguide section comprises a section of single-mode optical fiber connected to the fiber optic coil.

According to particular and advantageous aspects:
- the first polarizer and the at least one other polarizer are linear polarizers having polarization axes that are aligned relative to each other;
- the defect of axial alignment between the first waveguide end of the first polarizer and the second waveguide end of said optical waveguide section is lower than $w_0/2$ and preferably lower than $w_0/10$;
- said optical waveguide section is a section of polarizing fiber.

In a particular embodiment, the coil splitter is an optical waveguide splitter and the interferometric system further includes at least one other thin-plate polarizer having a thickness e lower than or equal to $$2 \times \frac{\pi w_0^2}{\lambda_m},$$

said at least one other thin-plate polarizer being arranged in the Rayleigh zone between at least one output path of the coil splitter and an end of the fiber optic coil.

The present invention also relates to the characteristics that will be revealed in the following description and that will have to be considered in isolation or according to any technically possible combination thereof.

The invention will find a particularly advantageous application in a fiber-optic gyroscope, for example integrated in an inertial navigation or guiding system.

Figure 3:
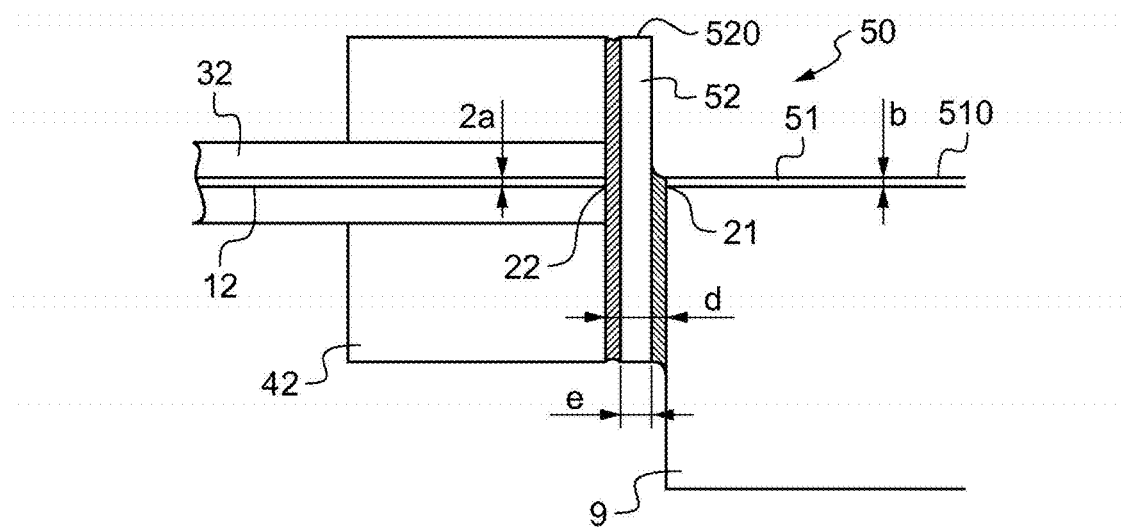
Figure 4:
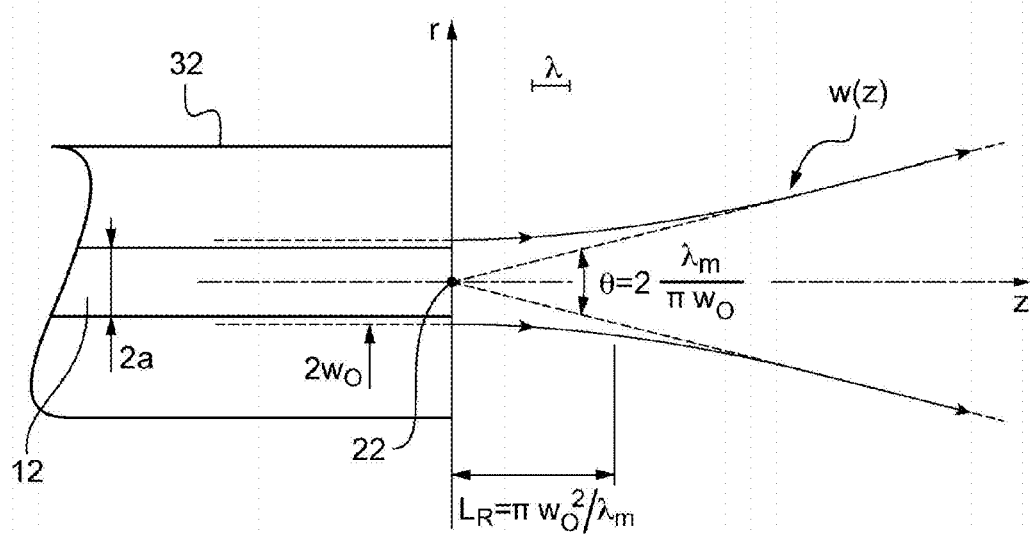
Figure 5:
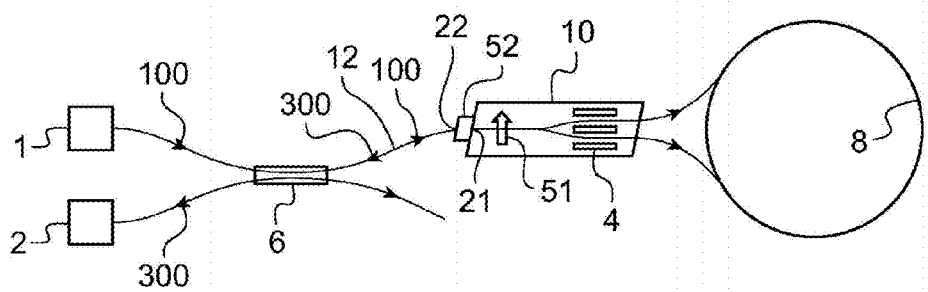
Figure 6:
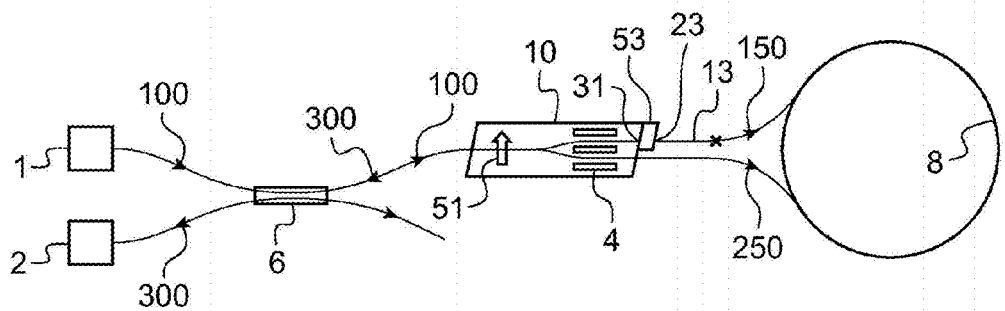
Figure 7:
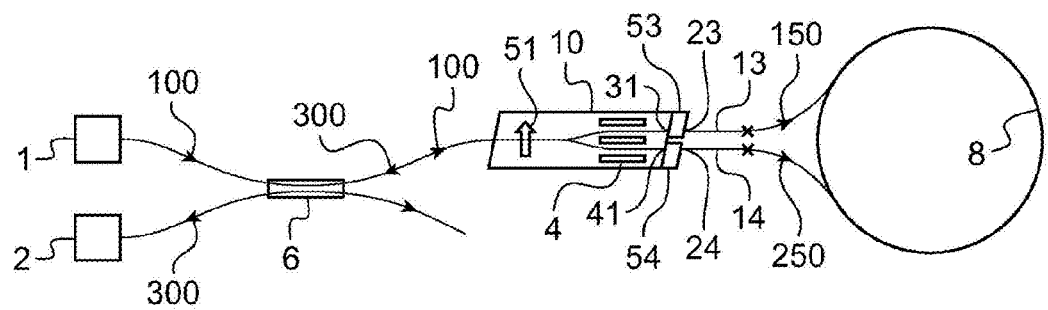
Figure 8:
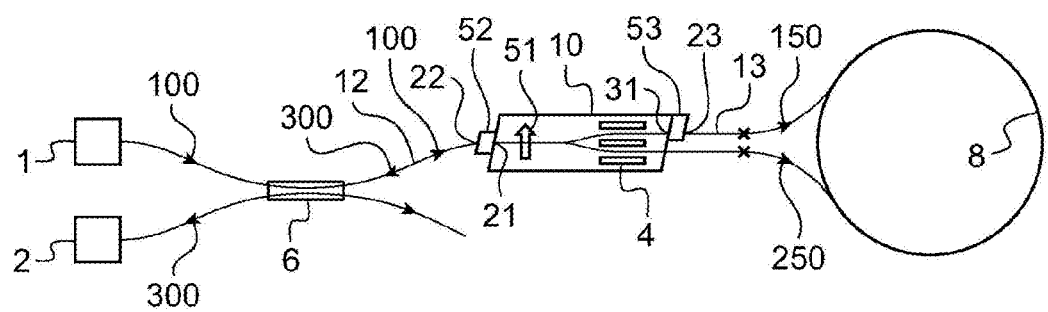
Figure 9:
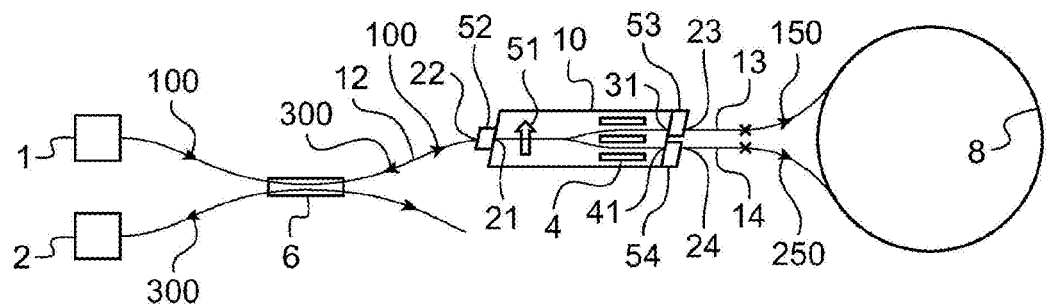

This description, given by way of non-limitative example, will allow to better understand how the invention may be implemented, with reference to the appended drawings, in which:

FIG. 1 schematically shows a ring fiber-optic interferometric system according to the prior art;

FIG. 2 schematically shows a sectional view of an optical fiber end connected to a waveguide polarizer according to the prior art;

FIG. 3 schematically shows a sectional view of an optical fiber end connected to polarization means according to an embodiment of the invention;

FIG. 4 illustrates the divergence of a Gaussian beam at the output of a single-mode optical fiber;

FIG. 5 schematically shows a ring fiber-optic interferometric system according to a first embodiment of the invention;

FIG. 6 schematically shows a ring fiber-optic interferometric system according to a second embodiment of the invention;

FIG. 7 schematically shows a ring fiber-optic interferometric system according to a third embodiment of the invention;

FIG. 8 schematically shows a ring fiber-optic interferometric system according to a fourth embodiment of the invention;

FIG. 9 schematically shows a ring fiber-optic interferometric system according to a fifth embodiment of the invention.

FIG. 3 proposes to use polarization means 50 comprising a mounting of at least two polarizers in series in a particular configuration that allows avoiding spurious interferences.

A first waveguide polarizer 51 is chosen.

In one embodiment, the first polarizer 51 is a waveguide polarizer integrated on an integrated optical circuit. Preferably, the first polarizer 51 is formed by proton exchange on a lithium niobate substrate.

In a variant embodiment, the first polarizer 51 is a polarizing fiber.

An aspect of the invention consists in selecting a second polarizer 52 operating in transmission and having an ultra-thin thickness. Preferably, the ultra-thin polarizer 52 has a thickness e lower than or equal to 50 microns.

Another aspect of the invention consists in placing the second ultra-thin polarizer 52 between the end 21 of the first waveguide polarizer 51 and the end 22 of the other waveguide.

In a variant embodiment, the other waveguide is a waveguide integrated on an integrated optical circuit.

In another variant embodiment, detailed in connection with FIG. 3, the other waveguide is consisted of the core 12 of an optical fiber 32.

It is noted, respectively:
- 2a the diameter of the core 12 of the optical fiber 32,
- b the cross dimension of the polarizing waveguide 51,
- e the thickness of the second polarizer 52, and d the distance between the end 21 of the first waveguide polarizer 51 and the end 22 of the other waveguide 12.

The dimensions 2a and b are chosen so that the optical coupling between the two waveguides are possible in the two directions of propagation. The mode diameters of the different guides must hence be compatible, which may be made with a great tolerance.

More precisely, the end 22 of the optical fiber 32 is arranged at a physical distance d from the end 21 of the first waveguide polarizer 51, the physical distance d being lower than or equal to twice the length of the Rayleigh zone defined by the following relation:

$$d \leq 2 \times \frac{\pi w_0^2}{\lambda_m},$$

where $w_0$ represents the radius of a single-mode beam in the optical guiding means and $\lambda_m$ represents the wavelength of the source beam 100 in the material of the polarizer $$\left(\lambda_m = \frac{\lambda_0}{n}\right),$$

where n represents the refractive index of the material of the polarizer and $\lambda_o$ represents the wavelength of the source beam 100 in vacuum.

The second polarizer 52 is a thin-plate polarizer, or ultra-thin polarizer, whose thickness satisfies the condition:

$$e \leq d \leq 2 \times \frac{\pi w_0^2}{\lambda_m}.$$

Advantageously, the ultra-thin polarizer 52 is made of an inorganic material. An inorganic polarizer offers an increased resistance to the source beams and provides the interferometric system with a longer lifetime.

Such an ultra-thin polarizer 52 is for example manufactured by the Corning company under the brand name "Polarcor UltraThin Glass Polarizers". Such an ultra-thin polarizer 52 is consisted of a polarizing glass plate having a thickness of about 30 microns±10 microns. The dimensions of an ultra-thin polarizer may be defined as a function of the needs of the application, except the thickness. For example, an ultra-thin polarizer having a width of 1 mm and a length of 2 mm is used. An ultra-thin plate polarizer 52 has generally a polarization rejection ratio of −20 dB able to go up to −23 dB according to the manufacturer specification. The spectral band of transmission of the ultra-thin plate polarizer 52 is located in the near infrared (about 1310 nm and 1550 nm).

An ultra-thin polarizer has the advantage to have a bandwidth of several tens of nanometers (for example 1275-1345 nm or 1510-1590 nm). The bandwidth of the thin-plate polarizer is hence more extended than the spectral band of the source. The thin-plate polarizer does not reduce the bandwidth of the interferometric system. It is observed that the bandwidth of the thin-plate polarizer is more extended than that of a polarizing optical fiber. Indeed, the bandwidth of a polarizing fiber is generally of 40 to 60 nm. Moreover, the bandwidth of an optical fiber may further be reduced due to the curvatures of the fiber. On the other hand, these fibers eliminate the fast polarization and not the slow polarization. Now, an integrated optical circuit made of proton-exchange lithium-niobate lets the fast polarization pass through. Spurious signals of the polarizing fiber may then interfere with the useful signal of the integrated optical circuit.

In a preferred embodiment, illustrated in FIG. 3, the first ultra-thin polarizer 52 is directly bonded to the input of the waveguide polarizer 51, i.e. to the edge 19 of the substrate 9. On the other hand, the ultra-thin plate polarizer 52 is bonded to the ferrule 22 of a single-mode optical fiber 20. Advantageously, the glue 23 used to bond the ultra-thin plate polarizer 52 is transparent at the wavelength of the source. Preferably, the glue has a refractive index adapted to the fiber and/or to the integrated optical circuit. Advantageously, the glue has a negligible thickness (from less than 1 micron to at most a few microns). In this respect, FIG. 5 is not a representation on scale, the thickness of the glue being much lower than the thickness e of the ultra-thin polarizer 52.

The input optical fiber has a core diameter equal to 2a. The waveguide polarizer 51 has a cross dimensions b. Preferably, the cross dimensions of the optical fiber 20 and of the waveguide polarizer 51 are identical. The longitudinal axes of the optical fiber 20 and of the waveguide polarizer 51 are aligned, so as to avoid the optical losses. In an exemplary embodiment, the waveguide is manufactured by proton exchange on a lithium niobate substrate, and the waveguide has, by construction, an elliptic section, with a ratio between the two axes of the ellipse almost equal to two.

The axis of TE polarization of the ultra-thin plate polarizer 52 is aligned on the axis of TE polarization of the polarizing waveguide 51 before the bonding.

Particularly advantageously, the ultra-thin plate polarizer 52 has a parallelepipedal external shape, of 1 mm wide by 2 mm long, with an external facet 520 parallel to a polarization axis of the ultra-thin polarizer 52. Now, the lithium-niobate integrated circuit has a lower surface and an upper surface 510 that are plane and parallel to the polarization axis of the waveguide 5. To align the axis of the ultra-thin plate polarizer 52 to the polarization axis of the waveguide polarizer 51, it is then sufficient to mechanically align the facet 520 of the ultra-thin polarizer 52 to the planar face 510 of the integrated optical circuit. This mechanical alignment allows limiting to a few tenths of degrees the alignment defect between the axes of the ultra-thin polarizer 52 and of the waveguide polarizer 5. A finer alignment in orientation may then be performed.

The arrangement of FIG. 3 allows arranging in series a first waveguide polarizer 51, a second ultra-thin polarizer 52 and the end of the optical fiber 20. Advantageously, the second ultra-thin polarizer 52 operates by absorption so that the TM polarization is strongly attenuated at the input of the second waveguide polarizer 5. The second ultra-thin polarizer 52 induces an optical loss by insertion of about −0.5 dB, so that the transmitted polarization state, for example TE, is not much affected by the insertion losses linked to the second polarizer 52.

The extinction ratio of the two polarizers 51, 52 in series is improved by about −25 dB to −35 dB, and the polarizer on IOC has a rejection ratio of −45 to −65 dB, which allows reaching a total polarization rejection ratio of about −70 dB to −100 dB.

It can be noticed that the mounting of FIG. 3 operates in the two directions of propagation of the guided optical beams. The polarization means 50 of FIG. 3 are hence perfectly reciprocal.

Advantageously, the second polarizer 52 extends over the face of the substrate 9 of the integrated optical circuit that is transverse to the polarizing waveguide 51. That way, the second polarizer 52 allows attenuating the transmission of spurious beams between the optical fiber 32 and the substrate 9 of the integrated optical circuit, and that in the two directions of propagation.

The polarization means 50 formed of at least a first waveguide polarizer 51, a second thin-plate polarizer 52 and another waveguide 12, are easily inserted into the fiber-optic interferometric system, on the optical path between the receiver splitter 6 and the fiber optic coil 8.

Thanks to the polarization means 50, the optical beam 100 coming from the source is linearly polarized in series, for example in transmission, via the second polarizer 52 then the first polarizer 51. These polarization means 50 allow increasing the polarization rejection ratio without increasing the bulkiness of the fiber-optic interferometric system.

Unlike the prior-art devices in which two polarizers are arranged in series, with a birefringent fiber between the two polarizers, no channeled spectrum is observed on the detected interferometric signal.

On the contrary, it is observed that this result does not apply to a more common, polarizing thin-layer polarizer on a glass substrate, as for example a glass polarizer Polarcor™ of the Corning company formed of two polarizing thin layers of 30 to 50 micrometers thick, deposited on the two opposite faces of a glass plate of 0.5 to 0.15 mm thick. Such a thin-layer polarizer has yet a very high polarization rejection ratio of at least −40 dB, which makes it a priori more interesting in the searched application. Indeed, it is searched to maximize the polarization rejection ratio at the input-output of the interferometer, to ideally aim at a polarization rejection ratio of −90 dB to −100 dB. Such a polarizer leads to too high losses of about 5 dB in simple passage, i.e. 10 dB at the common input/output.

Within the framework of the present invention, the result obtained with an ultra-thin plate polarizer 52 arranged in series with the waveguide polarizer 51 is analysed as follows, in connection with FIG. 4.

Let's consider a Gaussian single-mode beam propagating in the core 12 of the optical fiber 32. The diameter of the core 12 of the optical fiber is noted 2a. The diameter of a Gaussian single-mode beam propagating in the core of the optical fiber is noted: $2w_0$.

At the end of the optical fiber 32, the propagation of the Gaussian beam in free space is performed along the longitudinal direction Z according to two distinct regimes. In a so-called near-field, first part between the end of the optical fiber and a distance called the Rayleigh length, the beam propagates with an almost-null divergence. The Rayleigh length $L_R$ is defined as follows:

Let's N be such that $2w_o = N\lambda_m$ $$L_R = \frac{\pi w_0^2}{\lambda_m},$$

hence the approximation:

$$L_R \approx \frac{(2w_0)^2}{\lambda_m} = N^2 \lambda_m$$

In a so-called far-field, second part, beyond the Rayleigh length, the beam propagates with a divergence having an angular aperture equal to θ, defined as follows:

$$\theta = 2\frac{\lambda}{\pi w_0}$$

hence the approximation:

$$\theta \approx \frac{\lambda}{2w_0} \approx \frac{1}{N}$$

where N represents the number of wavelengths contained in $2w_0$ of the optical fiber 20.

For a diameter 2a of the fiber core equal to 6 microns, a wavelength in vacuum equal to $\lambda_0=1.55$ μm, the diameter of the single-mode beam is $2 w_0$ equal to about 8 μm and the Rayleigh length is equal to about 48 microns in a medium of index n=1.5. In a zone, called the Rayleigh zone, extending over a length $L_R$ from the end 22 of the optical fiber 32 and of diameter $2w_0$, the beam divergence is almost null, the beam diameter thus remains equal to $2w_0=8$ microns.

At a distance along the axis Z of 50 microns, the beam diverges and has a diameter 2w (z=50 μm) of about 11.8 microns, and at a longitudinal distance Z of 150 microns, the beam diameter 2w (z=150 μm) is of about 26 microns. At a distance of 65 μm, equal to twice the Rayleigh length, the beam diameter 2w (z=65 μm) is of about 13.4 microns. In practice, if the two guides have the same size, the loss is of 3 dB at a distance of twice the Rayleigh length.

In an exemplary embodiment, the optical fiber has a mode diameter $2w_0$ between about 6 and 8 μm. The polarizing waveguide 51 has a rather elliptic (and not circular) mode, having a great axis of about 8 microns of diameter and a small axis of about 4 microns of diameter.

It is chosen an ultra-thin plate polarizer 52 of physical thickness e lower than the Rayleigh length arranged between the end of the optical fiber and the end of the waveguide polarizer 51. Hence, the Gaussian single-mode beam exiting from the optical fiber remains very little divergent between the end of the optical fiber 20 and the input of the integrated waveguide polarizer 51.

This arrangement allows significantly reducing the spurious couplings out of the polarizing waveguide and reducing the spurious beams propagating in the substrate of the integrated waveguide polarizer. Moreover, the losses induced in the polarized and guided beam are reduced, in practice to less than 1 dB. In the reverse direction of propagation, the core 12 of the fiber collects almost no light beam propagating in the substrate of the waveguide polarizer 51.

This combination allows adding efficiently the polarization rejection ratio of the first polarizer 51 and of the second polarizer 52, without generating spurious interference beam.

The longitudinal axis at the end of the waveguide section 12 is preferably aligned on the longitudinal axis of the waveguide polarizer. Advantageously, the defect of axial alignment between the first waveguide end 21 of the first polarizer 51 and the second waveguide end 22 of said optical waveguide section 12 is lower than $w_0/2$, and preferably lower than $w_0/10$.

The axial alignment of the thin-plate polarizer is not critical, when it is arranged on the source side.

The ultra-thin plate polarizer 52 being preferably consisted of glass further has the advantage to be more resistant to a laser beam than an organic polarizer.

On the contrary, with a thin-layer polarizer, whose thickness is comprised between 0.15 and 0.5 mm, i.e. between 150 microns and 500 microns, the first waveguide polarizer 51 cannot be arranged in the Rayleigh zone of the optical fiber. In this case, the beam polarized by the thin-layer polarizer diverges: a part of this beam is transmitted in the waveguide polarizer and another part of this beam, of non-negligible power, may be transmitted via the substrate of the waveguide polarizer, which induces non-negligible losses, and possibly the appearance of a channeled spectrum. The use of a thin-layer polarizer of thickness higher than the Rayleigh length hence produces too important losses.

A thin-plate polarizer, i.e. of thickness lower than the Rayleigh length, has a polarization rejection ratio limited in practice to about −20 dB to −35 dB, i.e. lower by several orders of magnitude than the polarization rejection ratio, about −40 dB, of a thin-layer polarizer, having a thickness of 150 to 500 μm. Nevertheless, the juxtaposition of a thin-plate polarizer and a waveguide polarizer formed by proton exchange on a lithium niobate substrate allows reaching a measured polarization rejection ratio of 80 to 110 dB with very little losses.

The positioning tolerance of the thin-plate polarizer is hence far lower in the longitudinal direction along the axis Z than in a cross direction. In cross direction, the dimensions of the thin-plate polarizer are far greater than the mode size.

The interferometric system of the invention paradoxally consists in selecting a first polarizer that has an admittedly moderated polarization rejection ratio, but that has a thickness lower than the Rayleigh length, to allow arranging in series the first polarizer and the second polarizer in this Rayleigh zone at the output of the optical fiber 20.

In a variant embodiment, the optical fiber 20 may be replaced by a first waveguide on an integrated optical circuit, having transverse dimensions similar to those of the second waveguide polarizer. In this case, the first ultra-thin plate polarizer is arranged between the first waveguide on an integrated optical circuit and the second waveguide polarizer, so that the first and second polarizers are in the Rayleigh zone of the first waveguide on an integrated optical circuit.

In a particular embodiment, the optical fiber 32 is a polarizing or polarization-maintaining fiber. In another variant embodiment, the optical fiber 32 is replaced by a polarizing waveguide.

FIGS. 5 to 9 illustrate different embodiments of the invention.

FIG. 5 proposes a ring fiber-optic interferometric system according to an embodiment of the invention. The same elements as those appearing in FIG. 1 are denoted by the same references. In this interferometric system, a first waveguide polarizer 51 and a second thin-plate polarizer 52 are arranged in series at the common input-output of the fiber optic coil, between the coil splitter 3 and the receiver splitter 6. The second polarizer 52 is adjacent to the first polarizer 51.

The first polarizer 51 is a waveguide polarizer on an integrated optical circuit, preferably formed on a lithium niobate substrate.

Advantageously, the first waveguide polarizer 51 is integrated on the common branch of a Y-junction splitter 3 and the ultra-thin plate polarizer 52 is placed at the common input-output of the integrated optical circuit 10. The second polarizer 52 is bonded to the end of an optical fiber 12 that connects the input-output of the interferometer to the source splitter 6. The second thin-plate polarizer 52 is arranged between the end 22 of the optical fiber 12 and the end 21 of the first waveguide polarizer 51.

In the first embodiment, the thin-plate polarizer 52 is aligned on the waveguide polarizer 51. In this case, the alignment of the polarization axes is not much critical, because it is estimated that an alignment defect of 5 degrees is liable to induce a limited loss of 1% on the detected signal.

In the example of FIG. 5, at the input of the fiber-optic interferometer, the source beam 100 is polarized successively by the thin-plate polarizer 52 then by the waveguide polarizer 51. Similarly, at the output of the fiber-optic interferometer, the interferometric beam 300 is polarized successively by the waveguide polarizer 51 then by the thin-plate polarizer 52.

In the first embodiment, the thin-plate polarizer 52 is arranged at the common input-output of the interferometer. The advantage of this embodiment is that the source beam 100 and the interferometric beam 300 each pass once through the same thin-plate polarizer 52. The effect of the polarizer 52 is hence used twice.

Hence, the interferometric system has a polarization rejection ratio that allows strongly reducing the bias error induced by polarization. It is estimated that the bias error is hence reduced by a factor equal to the extinction ratio of the polarizer. For polarizer having 20 dB of rejection ratio, the reduction of the bias error is maximum when the two axes of the polarizers are aligned relative to each other. The bias error is proportional to a factor $100*\cos^2$ of the angle of misalignment between the polarization axis of the IOC and of the thin-plate polarizer. Another advantage of this configuration is to perform the same filter on the anti-symmetric mode of the IOC.

As an alternative and/or as a complement, another ultra-thin plate polarizer may be arranged at the output of the integrated optical circuit 10, on the optical path of the first split beam 150 and/or of the second split beam 250, in the Rayleigh zone at the output of the integrated optical circuit 10, the thickness of this other ultra-thin polarizer being also lower than the Rayleigh length.

In a second embodiment, shown in FIG. 6, the first waveguide polarizer 51 is integrated on the common branch of a Y-junction splitter 3 which extends up to the output end 31 of the integrated optical circuit and a thin-plate polarizer 53 is placed on one of the output branches of the integrated optical circuit 10. The thin-plate polarizer 53 is bonded to the end 23 of a section of optical fiber 13 that connects an end of the fiber optic coil 8 to the output of the integrated optical circuit to which is bonded the thin-plate polarizer 53.

In the example of FIG. 6, the first split beam 150 is polarized successively by the waveguide polarizer 51 than by the thin-plate polarizer 53 before entering into the fiber optic coil 8. Similarly, at the output of the fiber optic coil 8, the second split beam 250 is polarized successively by the thin-plate polarizer 53 then by the waveguide polarizer 51. In this case, compared to the first embodiment, the effect on the bias is lower, because the beams pass only once in the thin-plate polarizer 53. However, in the case where there is only one polarizer 53 in one of the two paths, the effect of reduction of the bias error is then very limited, because only the bias due to a single one of the two paths is reduced. Due to the fact that the beams pass only once in the thin-plate polarizer 53, this configuration offers the advantage to limit the losses.

In the second embodiment, the thin-plate polarizer 53 is arranged on the side of the fiber optic coil 8. In this case, the alignment of the thin-plate polarizer 53 with respect to the waveguide polarizer 51 is hence critical, due to the cosine effect.

In a third embodiment, shown in FIG. 7, the interferometric system includes another thin-plate polarizer on each output path of the coil splitter.

Advantageously, in the example illustrated in FIG. 7, the first waveguide polarizer 51 is integrated on the common branch of a Y-junction splitter 3 which extends up to the output ends 31, 41 of the integrated optical circuit. A thin-plate polarizer 53, respectively 54, is placed on each end 31, respectively 41, of two output branches of the integrated optical circuit 10. A thin-plate polarizer 53 is bonded to the end 23 of a section of optical fiber 13 that connects an end of the fiber optic coil 8 to the end 31 of the polarized waveguide. Another thin-plate polarizer 54 is bonded to the end 24 of a section of optical fiber 14 that connects the other end of the fiber optic coil 8 to the other end 41 of the polarized waveguide. Advantageously, a single and same thin-plate polarizer may extend over the two ends 31, 41 of the polarized waveguide. This embodiment allows adding a polarizer symmetrically on the two output paths.

In the case where the output paths of the IOC 10 are separated by less than a distance lower than the length of a thin-plate polarizer, it is possible to use a single and same ultra-thin plate polarizer at the output of the IOC to cover the two ends 31 and 41. In an exemplary embodiment, the length of a thin plate polarizer is of 2 mm, which allows covering waveguide ends separated by less than 2 mm. It is to be noted that thin-plate polarizers of length far higher than 2 mm exist.

In the example of FIG. 7, the first split beam 150 is polarized successively by the waveguide polarizer 51, then by the thin-plate polarizer 53 before entering into the fiber optic coil 8. At the output of the fiber optic coil 8, the first split beam 150 is polarized successively by the thin-plate polarizer 54, then by the waveguide polarizer 51. Similarly, the second split beam 250 is polarized successively by the waveguide polarizer 51, then by the thin-plate polarizer 54 before entering into the fiber optic coil 8. At the output of the fiber optic coil 8, the second split beam 250 is polarized successively by the thin-plate polarizer 53, then by the waveguide polarizer 51.

In a third embodiment, a thin-plate polarizer 53, respectively 54, is arranged at each end of the fiber optic coil. This configuration allows the beams entering into the coil and exiting from the coil to pass through the two thin-plate polarizers, which allows doubling the rejection effect of the thin-plate polarizer, similarly to the first embodiment. The effect on the bias error is function of the square root of the sum of the rejection ratios of the polarizers, but also function, on the one hand, of the angle of misalignment between the waveguide polarizer 51 and the thin-plate polarizer 53 and, on the other hand, of the angle of misalignment between the waveguide polarizer 51 and the thin-plate polarizer 54. However, in the third embodiment, the anti-symmetric mode of the integrated optical circuit is not filtered by the thin-plate polarizer.

The configurations of FIGS. 5 to 7 may be combined between each other.

In a fourth embodiment, shown in FIG. 8, the first waveguide polarizer 51 extends from the end 21 to the end 31 of the branches of the integrated optical circuit 10. A thin-plate polarizer 52 is placed on the common input-output of the integrated optical circuit 10 and another thin-plate polarizer 53 is placed on one of the output branches of the integrated optical circuit 10. On the other hand, the thin-plate polarizer 52 is bonded to the end of a section of optical fiber 12 that connects the input-output of the interferometer to the source splitter 6. Hence, the thin-plate polarizer 52 is arranged between the end 22 of the optical fiber 12 and the end 21 of the first waveguide polarizer 51. The distance between the end 21 and the end 22 is lower than the Rayleigh length $L_R$. The other thin-plate polarizer 53 is bonded, on the one hand, to the end 31 of the integrated optical circuit and, on the other hand, to the end 23 of the section of optical fiber 13 that is arranged directly opposite an end of the fiber optic coil 8.

In the example of FIG. 8, at the input of the fiber-optic interferometer, the source beam 100 is polarized successively by the thin-plate polarizer 52 then by the waveguide polarizer 51. Then, the first split beam 150 is polarized successively by the waveguide polarizer 51, then by the thin-plate polarizer 53 before entering into the fiber optic coil 8. A the output of fiber optic coil 8, the second split beam 250 is polarized successively by the thin-plate polarizer 53, then by the waveguide polarizer 51. Finally, at the output of the fiber-optic interferometer, the interferometric beam 300 is polarized successively by the waveguide polarizer 51, then by the thin-plate polarizer 52. This embodiment allows summing the advantages of the first and of the second embodiment.

In a fifth embodiment, shown in FIG. 9, the first waveguide polarizer 51 extends from the end 21 to the ends 31 and 41 of the branches of the integrated optical circuit 10. A thin-plate polarizer 52 is placed at the common input-output of the integrated optical circuit 10. The thin-plate polarizer 52 is bonded to the end of a section of optical fiber 12 that connects the input-output of the interferometer to the source splitter 6. Hence, the thin-plate polarizer 52 is arranged between the end 22 of the optical fiber 12 and the end 21 of the first waveguide polarizer 51. The distance between the end 21 and the end 22 is lower than the Rayleigh length $L_R$.

On the other hand, a thin-plate polarizer 53, respectively 54, is placed at each end 31, respectively 41, of the two output branches of the integrated optical circuit 10. The thin-plate polarizer 53, respectively 54, is bonded, on the one hand, to the end 31, respectively 41, of the integrated optical circuit and, on the other hand, to the end 23, respectively 24, of a section of optical fiber 13, respectively 14, that are arranged opposite each of the ends of the fiber optic coil 8, respectively.

In the example of FIG. 9, at the input of the fiber-optic interferometer, the source beam 100 is polarized successively by the thin-plate polarizer 52, then by the waveguide polarizer 51. Then, the first split beam 150 is polarized successively by the waveguide polarizer 51, then by the thin-plate polarizer 53 before entering into the fiber optic coil 8. At the output of the fiber optic coil 8, the first split beam 150 is polarized successively by the thin-plate polarizer 54, then by the waveguide polarizer 51. Similarly, the second split beam 250 is polarized successively by the waveguide polarizer 51, then by the thin-plate polarizer 54 before entering into the fiber optic coil 8. At the output of the fiber optic coil 8, the second split beam 250 is polarized successively by the thin-plate polarizer 53, then by the waveguide polarizer 51. Finally, at the output of the fiber-optic interferometer, the interferometric beam 300 is polarized successively by the waveguide polarizer 51, then by the thin-plate polarizer 52. This embodiment allows summing the advantages of the first and of the third embodiment.

In a preferred embodiment, the fiber optic coil is formed of a standard single-mode optical fiber. In another embodiment, the fiber optic coil is formed of a polarization-maintaining optical fiber, whose axes are aligned to the axes of the waveguide polarizer 51 and/or of at least one thin-plate polarizer 53, 54, respectively.

The invention claimed is:

1. A fiber-optic interferometric system comprising:
    a light source adapted to emit a source beam at a wavelength $\lambda_0$ in vacuum;
    a fiber optic coil forming a ring optical path;
    a coil splitter adapted to spatially separate the source beam into a first split beam and a second split beam, so that the first split beam and the second split beam travel through the fiber optic coil in opposite directions, the coil splitter being adapted to recombine said first split beam and second split beam after propagation in opposite directions in the fiber optic coil, so as to form an interferometric beam;
    a receiver splitter adapted to guide the interferometric beam towards a photodetector;
    polarization filtering means,
    wherein the polarization filtering means comprise:
        a first waveguide polarizer,
        at least one other thin-plate polarizer having a physical thickness e and a refractive index n, and
        at least one section of optical waveguide,
        the first polarizer and the at least one polarizer being juxtaposed in series in the optical path between the receiver splitter and the fiber optic coil,
        the at least one other thin-plate polarizer being interposed between, on the one hand, a first waveguide end of the first polarizer and, on the other hand, a second waveguide end of said optical waveguide section, the physical distance d between the first waveguide end of the first polarizer and the second waveguide end of said optical waveguide section being lower than or equal to twice the Rayleigh length, i.e.:

$$d \leq 2 \times \frac{\pi w_0^2}{\lambda_m},$$

where $$\lambda_m = \frac{\lambda_0}{n}$$

represents the wavelength of the beam in a medium of index n, $w_0$ represents the radius of a single-mode beam at 1/e in amplitude in said waveguides of said optical waveguide section and of the first waveguide polarizer, and
    the physical thickness e of the at least one other thin-plate polarizer being lower than or equal to the physical distance d.

2. The fiber-optic interferometric system according to claim 1, wherein the at least one other thin-plate polarizer has a physical thickness e lower than or equal to $$\frac{\pi w_0^2}{\lambda_m}$$

and wherein the physical distance d is lower than or equal to $$\frac{\pi w_0^2}{\lambda_m}.$$

3. The fiber-optic interferometric system according to claim 1, wherein the at least one other thin-plate polarizer has a physical thickness e lower than or equal to $$\frac{\pi w_0^2}{2 \times \lambda_m}$$

and wherein the physical distance d is lower than or equal to $$\frac{\pi w_0^2}{2 \times \lambda_m}.$$

4. The fiber-optic interferometric system according to claim 1, wherein the at least one other thin-plate polarizer has a physical thickness e lower than or equal to 50 microns.

5. The fiber-optic interferometric system according to claim 4, wherein the at least one other thin-plate polarizer is formed of a thin plate of polarizing glass.

6. The fiber-optic interferometric system according to claim 4, wherein the first waveguide polarizer is a fiber-optic polarizer.

7. The fiber-optic interferometric system according to claim 4, wherein the first waveguide polarizer is formed by proton exchange on a lithium niobate substrate.

8. The fiber-optic interferometric system according to claim 7, comprising an integrated optical circuit on a lithium niobate substrate, the integrated optical circuit comprising the first waveguide polarizer, the coil splitter and an optical phase modulator.

9. The fiber-optic interferometric system according to claim 4, wherein said at least one section of optical waveguide comprises a section of single-mode optical fiber connected to the fiber optic coil.

10. The fiber-optic interferometric system according to claim 9, wherein said section of optical waveguide is a section of polarizing fiber.

11. The fiber-optic interferometric system according to claim 1, wherein the at least one other thin-plate polarizer is formed of a thin plate of polarizing glass.

12. The fiber-optic interferometric system according to claim 1, wherein the first waveguide polarizer is a fiber-optic polarizer.

13. The fiber-optic interferometric system according to claim 1, wherein the first waveguide polarizer is formed by proton exchange on a lithium niobate substrate.

14. The fiber-optic interferometric system according to claim 13, comprising an integrated optical circuit on a lithium niobate substrate, the integrated optical circuit comprising the first waveguide polarizer, the coil splitter and an optical phase modulator.

15. The fiber-optic interferometric system according to claim 1, wherein said at least one section of optical waveguide, said at least one other thin-plate polarizer and the first waveguide end of the first polarizer are arranged on the optical path of the source beam between the coil splitter and the receiver splitter.

16. The fiber-optic interferometric system according to claim 1, wherein said at least one section of optical waveguide comprises a section of single-mode optical fiber connected to the receiving splitter.

17. The fiber-optic interferometric system according to claim 1, wherein said at least one section of optical waveguide, said at least one other thin-plate polarizer and the first waveguide end of the first polarizer are arranged on the optical path of the first split beam and/or of the second split beam, between the coil splitter and the fiber optic coil.

18. The fiber-optic interferometric system according to claim 1, wherein said at least one section of optical waveguide comprises a section of single-mode optical fiber connected to the fiber optic coil.

19. The fiber-optic interferometric system according to claim 1, wherein the first polarizer and the at least one other thin-plate polarizer are linear polarizers having polarization axes aligned relative to each other.

20. The fiber-optic interferometric system according to claim 1, wherein said section of optical waveguide is a section of polarizing fiber.

* * * * *